United States Patent
Sispoidis et al.

(10) Patent No.: US 8,277,323 B2
(45) Date of Patent: Oct. 2, 2012

(54) REMOTE TRACKING AND REPORTING OF SOFTWARE STATE

(75) Inventors: Peter Sispoidis, Guilford, CT (US); Justin Holmes, Guilford, CT (US); Jeffrey Thibeault, Branford, CT (US)

(73) Assignee: Radial Network Corp., New York, NY (US)

( * ) Notice: Subject to any disclaimer, the term of this patent is extended or adjusted under 35 U.S.C. 154(b) by 1000 days.

(21) Appl. No.: 12/082,448

(22) Filed: Apr. 11, 2008

(65) Prior Publication Data

US 2009/0029778 A1      Jan. 29, 2009

Related U.S. Application Data

(60) Provisional application No. 60/923,264, filed on Apr. 12, 2007, provisional application No. 60/923,344, filed on Apr. 12, 2007, provisional application No. 60/923,353, filed on Apr. 12, 2007, provisional application No. 60/923,352, filed on Apr. 12, 2007, provisional application No. 60/923,351, filed on Apr. 12, 2007, provisional application No. 60/923,346, filed on Apr. 12, 2007, provisional application No. 60/923,345, filed on Apr. 12, 2007.

(51) Int. Cl.
   *A63F 13/00* (2006.01)

(52) U.S. Cl. ............... 463/43; 463/40; 463/42; 707/962

(58) Field of Classification Search .................... 463/40, 463/42, 43; 707/962
See application file for complete search history.

(56) References Cited

U.S. PATENT DOCUMENTS

| | | |
|---|---|---|
| 5,105,184 A | 4/1992 | Pirani et al. |
| 5,781,894 A | 7/1998 | Petrecca et al. |
| 5,964,660 A | 10/1999 | James et al. |
| 6,002,450 A | 12/1999 | Darbee et al. |
| 6,036,601 A | 3/2000 | Heckel |
| 6,141,010 A | 10/2000 | Hoyle |
| 6,179,713 B1 | 1/2001 | James et al. |
| 6,216,112 B1 | 4/2001 | Fuller et al. |
| 6,285,985 B1 | 9/2001 | Horstmann |
| 6,321,209 B1 | 11/2001 | Pasquali |
| 6,442,529 B1 | 8/2002 | Krishan et al. |
| 6,513,052 B1 | 1/2003 | Binder |
| 6,628,314 B1 | 9/2003 | Hoyle |
| 6,640,336 B1 | 10/2003 | Ebisawa |
| 6,724,407 B1 | 4/2004 | Cheng |
| 6,766,369 B1 | 7/2004 | Hatsuka et al. |
| 6,771,290 B1 | 8/2004 | Hoyle |
| 6,782,417 B1 | 8/2004 | Rao |
| 6,810,527 B1 | 10/2004 | Conrad et al. |
| 6,872,137 B2 | 3/2005 | Singhal |
| 7,003,478 B1 | 2/2006 | Choi |
| 7,006,606 B1 | 2/2006 | Cohen et al. |
| 7,028,268 B1 | 4/2006 | Conley |
| 7,054,917 B1 | 5/2006 | Kirsch et al. |
| 7,155,508 B2 | 12/2006 | Saankuratripati et al. |
| 7,168,084 B1 | 1/2007 | Hendricks et al. |
| 2002/0029267 A1 | 3/2002 | Saankuratripati et al. |
| 2002/0082068 A1 | 6/2002 | Singhal |

(Continued)

*Primary Examiner* — James S McClellan
(74) *Attorney, Agent, or Firm* — VLP Law Group LLP

(57) ABSTRACT

A system and method for tracking data in a gaming environment using a beacon is provided and includes identifying an occurrence of a triggering event in a gaming environment, generating at least one key-value pair in response to the triggering event in the gaming environment, generating beacon data responsive to the at least one key-value pair and processing the beacon data to generate a key-value table data.

13 Claims, 9 Drawing Sheets

U.S. PATENT DOCUMENTS

| | | |
|---|---|---|
| 2002/0173359 A1 | 11/2002 | Gallo et al. |
| 2003/0101092 A1 | 5/2003 | Fuller et al. |
| 2003/0191690 A1 | 10/2003 | McIntyre et al. |
| 2004/0116183 A1 | 6/2004 | Prindle |
| 2004/0148424 A1 | 7/2004 | Berkson et al. |
| 2004/0199527 A1* | 10/2004 | Morain et al. ................ 707/100 |
| 2004/0205119 A1* | 10/2004 | Streble et al. ................ 709/203 |
| 2005/0005242 A1 | 1/2005 | Hoyle |
| 2005/0221897 A1* | 10/2005 | Oe ................................. 463/42 |
| 2005/0278629 A1 | 12/2005 | Chailleux |
| 2006/0136295 A1 | 6/2006 | Bobick et al. |
| 2006/0168664 A1 | 7/2006 | Frank et al. |
| 2006/0248209 A1 | 11/2006 | Chiu et al. |
| 2006/0264256 A1 | 11/2006 | Gagner et al. |
| 2006/0287105 A1 | 12/2006 | Willis |
| 2007/0088821 A1 | 4/2007 | Sankuratripatl et al. |
| 2007/0093360 A1 | 4/2007 | Neff et al. |
| 2007/0101361 A1 | 5/2007 | Spielman et al. |
| 2007/0112627 A1 | 5/2007 | Jacobs et al. |
| 2007/0112762 A1 | 5/2007 | Brubaker |

* cited by examiner

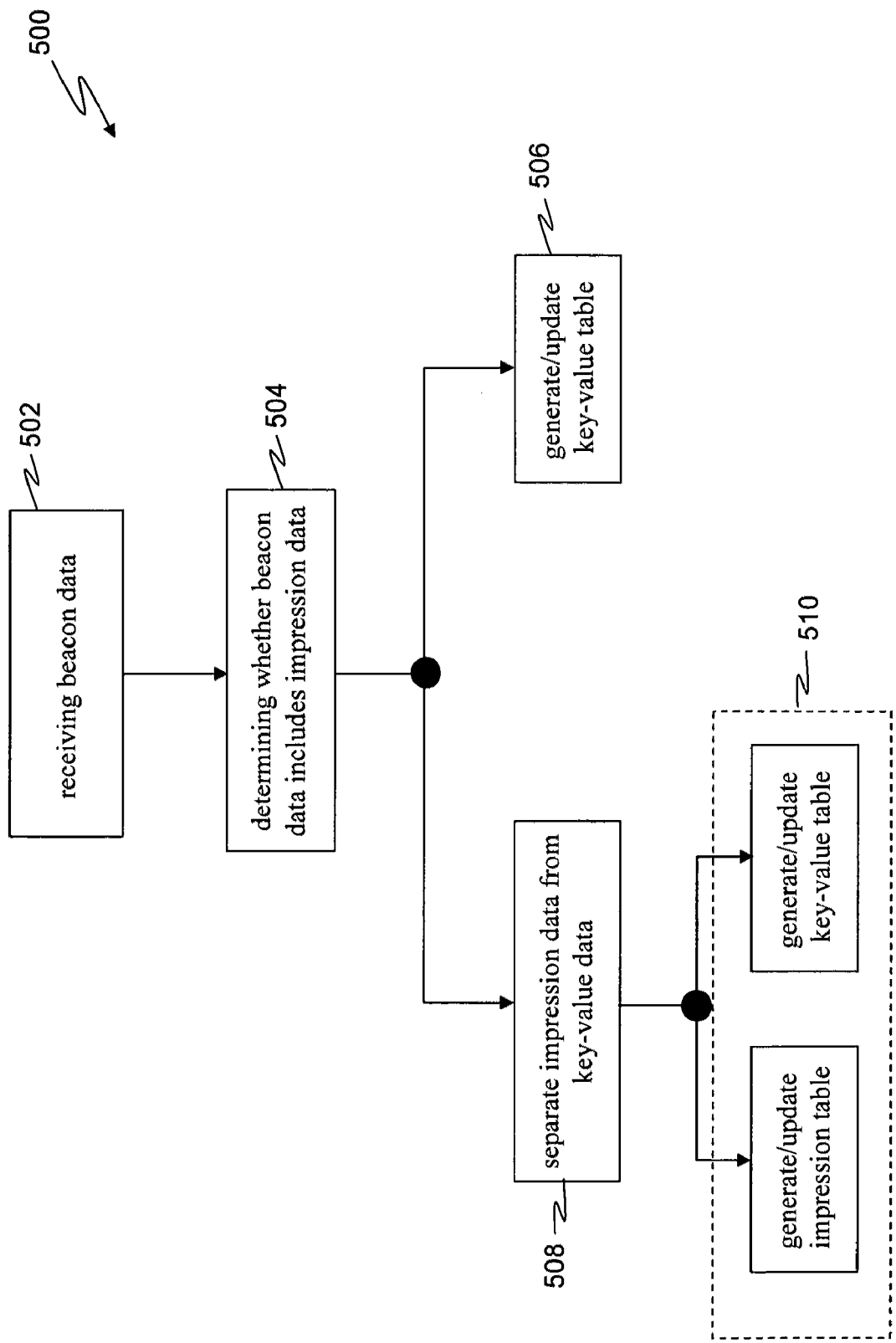

REMOTE TRACKING AND REPORTING OF SOFTWARE STATE

RELATED APPLICATIONS

This application relates to U.S. Provisional Patent Application Ser. No. 60/923,264, filed Apr. 12, 2007, U.S. Provisional Patent Application Ser. No. 60/923,344, filed Apr. 12, 2007, U.S. Provisional Patent Application Ser. No. 60/923,345, filed Apr. 12, 2007, U.S. Provisional Patent Application Ser. No. 60/923,346, filed Apr. 12, 2007, U.S. Provisional Patent Application Ser. No. 60/923,351, filed Apr. 12, 2007, U.S. Provisional Patent Application Ser. No. 60/923,352, filed Apr. 12, 2007, U.S. Provisional Patent Application Ser. No. 60/923,353, filed Apr. 12, 2007, all of which are incorporated by reference herein in their entireties.

FIELD OF THE INVENTION

This disclosure relates generally to the tracking of information and more particularly to the efficient tracking, storing and reporting of application specific information.

BACKGROUND OF THE INVENTION

As the placement of realistic advertisements in video games becomes more popular and acceptable in the gaming community, more and more video games are beginning to utilize video game advertisements as a viable source of revenue. Currently, most video games that employ realistic advertisements typically utilize a static advertising technique that involves placing each advertisement in one site throughout game play. As such, the location of the advertisement cannot change or move and other advertisements cannot take its place. Thus, although there may be multiple advertisements in one game, each advertisement can only occupy a single location throughout the entire game. This is undesirable because it lacks the ability to maximize the effect of the advertisement on the gamer.

One way to increase the exposure and effectiveness of the advertisement on the gamer is to utilize real-time dynamic advertising techniques which allow for the targeting of advertisements to specific gamers or groups of gamers. These dynamic advertising techniques allow multiple advertisements from different advertisers to be rotated through one or more sites during game play. Moreover, these dynamic advertising techniques allow for different content types, such as Billboard, Logo, Video, Audio and Beacons, to be used to display advertisements to the gamer. As a background, billboard type content is content that is displayed on a billboard type sign within the gaming environment, logo type content is content that is displayed as a poster like sign within the gaming environment, video type content is content that is displayed as a video within the gaming environment, audio type content is content that is broadcasted as sound within the gaming environment and beacon type content is content that is displayed as a static advertisement within the gaming environment. Cell or sites that are configured for each of these content types is capable of receiving and displaying multiple advertisements throughout the game for display or transmission to the gamer. For example, a racing game may have a billboard display advertising one product as the racing car passes the billboard a first time. However, subsequent times the race car goes around the curve and passes the billboard, entirely different advertisements may be displayed. Thus, dynamic advertising not only enhances the reality of the game's content, it maximizes the revenue generating capability of the software product by generating multiple revenue streams, as opposed to one revenue stream generated using static advertising techniques.

Unfortunately however, one problem that exists with dynamic advertising involves the ability to efficiently track, store and report upon application specific data when the type of information that is to be tracked is defined by the application developers and/or game publishers. One way to address this problem (i.e. how to transmit, aggregate, and report on data of which the system has no prior knowledge) is to used XML, which transmits generic type-less data in a standard format. However, this is an extremely inefficient endeavor for two reasons. First, the protocol required to transmit XML data is not compact, thus resulting in network traffic this is very large in size. Second, current back-end systems would have to implement an XML parser to retrieve the generic data. Unfortunately, this is a relatively slow process and would cause each of the servers to be able to handle fewer client connections than desired.

SUMMARY OF THE INVENTION

A method for tracking data in a gaming environment using a beacon is provided and includes generating a beacon cell, activating a trigger upon occurrence of a triggering event to generate key-value pair data, generating beacon data responsive to the key-value pair data and transmitting the beacon data to at least one of an application software and a cache file.

A system for implementing a method for tracking data in a gaming environment using a beacon is provided and includes a network having a database and a gaming device connected to the network and configured to operate in a gaming environment, wherein at least one of the gaming device and the network includes a means for, identifying an occurrence of a triggering event in a gaming environment, receiving at least one key-value pair data in response to the triggering event in the gaming environment, generating beacon data responsive to the at least one key-value pair data and processing the beacon data to generate a key-value table data.

A computer readable storage medium having computer executable instructions for implementing a method for tracking data in a gaming environment using a beacon is provided and includes identifying an occurrence of a triggering event in a gaming environment, receiving at least one key-value pair data in response to the triggering event in the gaming environment, generating beacon data responsive to the at least one key-value pair data and processing the beacon data to generate a key-value table data.

BRIEF DESCRIPTION OF THE DRAWINGS

The foregoing and other features and advantages of the present invention will be more fully understood from the following detailed description of illustrative embodiments, taken in conjunction with the accompanying figures in which like elements are numbered alike:

FIG. 8 is a block diagram illustrating an embodiment of an overall method for storing beacon data, in accordance with the present invention.

DETAILED DESCRIPTION

Figure 1A:
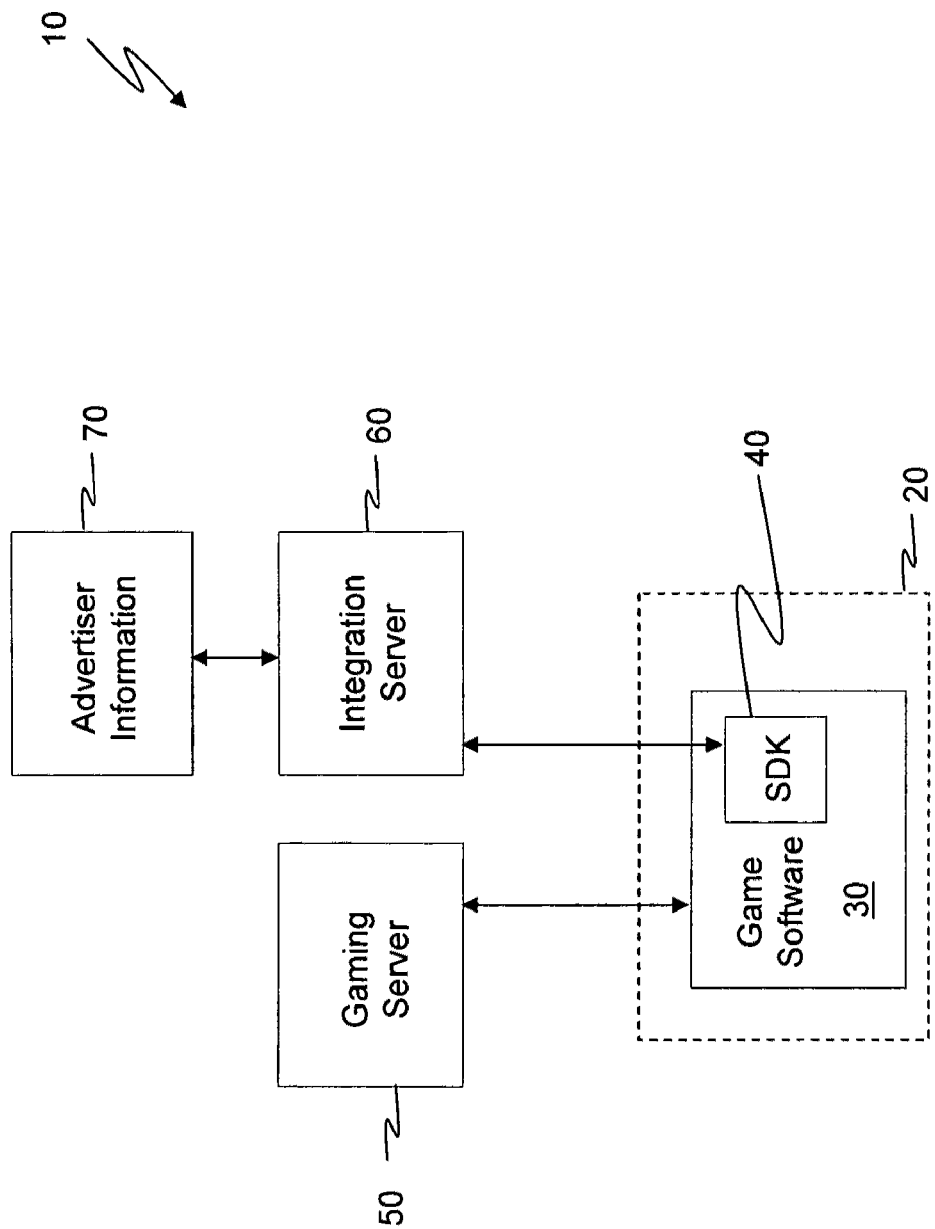
FIG. 1A is a high level schematic block diagram illustrating one embodiment of a gaming system, in accordance with the present invention.

The tracking of information relating to a gaming environment is desirable for many reasons and the information may include various types of information, such as the size of the advertisement on the screen (for example, a billboard may be between 2% and 100% of the screen size), the time the advertisement spends on the screen (for example, a billboard may have to be onscreen for a minimum period of time), and the deflection angle of the advertisement on the screen (for example, the average angle at which advertisement content was viewed from the player's perspective). Additionally, information that is related to the trigger point of a beacon may also be tracked. One way to track this information is by use of a beacon, in accordance with the present invention. It is contemplated that any type of advertising content may be implemented with the invention, including but not limited to 3-Dimensional and/or holographic content.

The concept of a beacon is an element that solves the problem of efficiently storing and reporting application-specific data when the type of information to be tracked is defined by the developers or publishers that implement the application software, such as a Software Development Kit (SDK), used to integrate the application software with the game software, wherein the application software is at least a portion of the vehicle (such as the software applications and code) used to integrate and display advertising content into the gaming environment and/or to transmit the data to a network so that the network can track the advertisements, user behavior and aggregate, and/or store and report on the results. Beacons also provide an excellent value-added service for those partners who want to evaluate user behavior and game play.

As discussed briefly hereinbefore, in designing a method to handle beacons, it was realized that the original problem (i.e. how to transmit, aggregate, and report on data of which the system has no prior knowledge) could be only be handled by one currently existing widely-known solution: XML, which transmits generic type-less data in a standard format. However, the implementation of XML within a system would have been an extremely inefficient endeavor for two reasons. First, the protocol required to transmit the XML data is not compact and would result in a large volume of network traffic. For example, the current XML method of stating data typically results in large and cumbersome data strings. Consider the situation for a beacon where the UserId is equal to "7" and the Time is equal to "118304". The data string generated using the current XML method would result in:

"<Beacon><UserId>7</UserId><Time>118304</Time></Beacon>."

However, the method of the present invention allows for the data string to be stated in a much more concise and compact manner. For example, the data string generated using the method of the present invention allows the data string above to be stated as:

"UserId=7&Time=118304."

As can be seen, the current XML method results in a data string that takes up almost twice the space as the method of the present invention and thus the invention allows for the size of the data stated to be reduced by more than half. Second, current back-end systems would have to implement an XML parser to retrieve the generic data. Unfortunately, this is an expensive and relatively slow process and would cause each of the servers to be able to handle fewer client connections than desired.

Since XML is undesirable for this application, the present invention provides for a new and unique method for handling data, where the method meets or exceeds desired efficiency standards while still having the flexibility of XML. In accordance with the present invention, one embodiment of the method of the invention is described hereinafter as being implemented with the transmission and storage of beacon data.

Regarding the transmission of the data, in order to be consistent with the Dynamic Content Protocol (DCP), i.e. the protocol used by the application software, small amounts of data are represented and passed in key-value format as typeless data which is encoded similarly to the way a Web site transmits parameters. Using this approach, key-value pairs are generated and concatenated into a single character string in a format which may be represented as, "<Key1>=<Value1>&<Key2>=<Value2>...,"

where the key-value pairs can be in any order, or contain any information that is desired and/or required by the application to be tracked. The only limitation imposed on the keys and values of the key-value pair is that they do not contain reserved characters. For example, if the reserved characters include "=" and "&," then the key and value of a key-value pair cannot contain the characters "=" and "&." This advantageously allows the back-end system to perform in an extremely efficient manner since the system can now easily break down a transmitted data string into its individual pairs simply by finding all of the "&" characters and then breaking each pair into a key and value by finding the "=" character.

For example, consider the situation which involves the concatenation of the following key-value pairs: "Whatad=123", "UserId=7", "Duration=10 s" and "Angle=0". When transmitting and storing beacon data, the key-value pairs are typically concatenated in order (although not necessarily) to keep the Dynamic Content Protocol (DCP) relatively small. Using the prior art XML method, concatenation of the above key-value pairs would result in the character string, "<Beacon><Whatad>123</Whatad><UserId>7</UserId><Duration>10 s</Duration><Angle>0</Angle></Beacon>,"

being generated and transmitted over the Network. However, concatenating the above key-value pair in accordance with the present invention results in the character string, "Whatad=123&UserId=7&Duration=10 s&Angle=0."

Thus, the resulting character string generated in accordance with the invention is reduced in size by more than 50% of the XML character string, i.e. from 96 characters to 40 characters.

Regarding the storage of the beacon data, the method of the present invention which allows the beacon data to be effectively reported for specific applications as well as across all applications within the network is also unique. Using current methods, the data is stored in a database table in which a row is added each time an entry is made, where the data keys indicate the column into which the value is inserted. Accordingly, this requires that the data keys be known in advance. Since the system is predicated on the concept that an application can track any data it wishes, when a key is transmitted that is not known by the system, the database table has to be adjusted by adding a new column. While possible, this overly complicates and reduces the efficiency of the reporting mechanism, since it has to keep track of the dynamic columns and maintain relationships between the applications and the data keys each application reports. Additionally, each row of the table may contain columns having no data, thereby causing the table to require more disk space than necessary to store data.

In order to solve this issue, the method of the present invention treats the data key as a "special value" to allow the data to be stored more efficiently and to allow reports to be provided based on just the keys, where keys may be stored separately from their values in a "key table." When a key is transmitted that the system doesn't know, a new row may be added in the key table with the new key. The main data table that stores the values may contain an index field to indicate which key the value is associated with. This advantageously allows the reporting mechanism to select a key to report upon and then use the key's index to find all or some of the data values that are associated with the key in the main table.

Figure 1B:
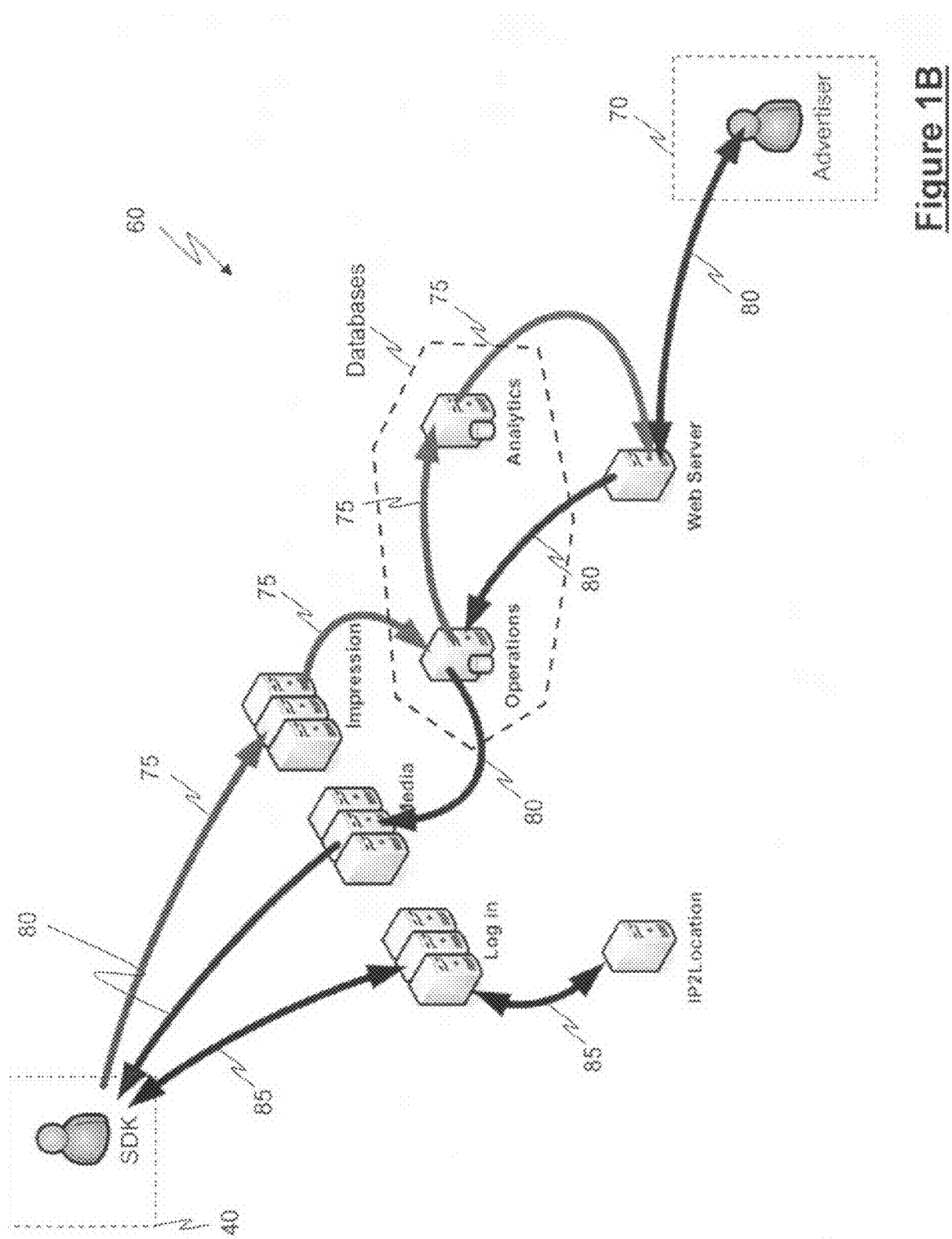
FIG. 1B is a lower level schematic block diagram illustrating the integration server of the embodiment of the gaming system of FIG. 1A, in accordance with the present invention.

The above discussed concepts are discussed herein with regards to a gaming environment as follows. Referring to FIG. 1A, one embodiment of a gaming system 10 for implementing the method of the invention showing the connectivity between the elements is shown and includes a user gaming device 20 having gaming software 30 and application software (SDK) 40, a gaming server 50 (optional) and an integration server 60 which includes advertiser information 70. During gameplay, the gaming software 30 communicates with the gaming server 50 (optional) to facilitate the gameplay and the SDK 40 communicates with the integration server 60 to facilitate the integration of advertising content. Referring to FIG. 1B, a lower level block diagram illustrating the elements of the integration server 60. As shown, the interaction within the integration server 60 is illustrated by a first set of arrows 75 which represents the flow of impressions through the integration server 60, a second set of arrows 80 which represents the flow of advertising content through the integration server 60 and a third set of arrows 85 which represents the flow of control messages (i.e. figuring out a user location, start session message, etc.) through the integration server 60.

Figure 2:
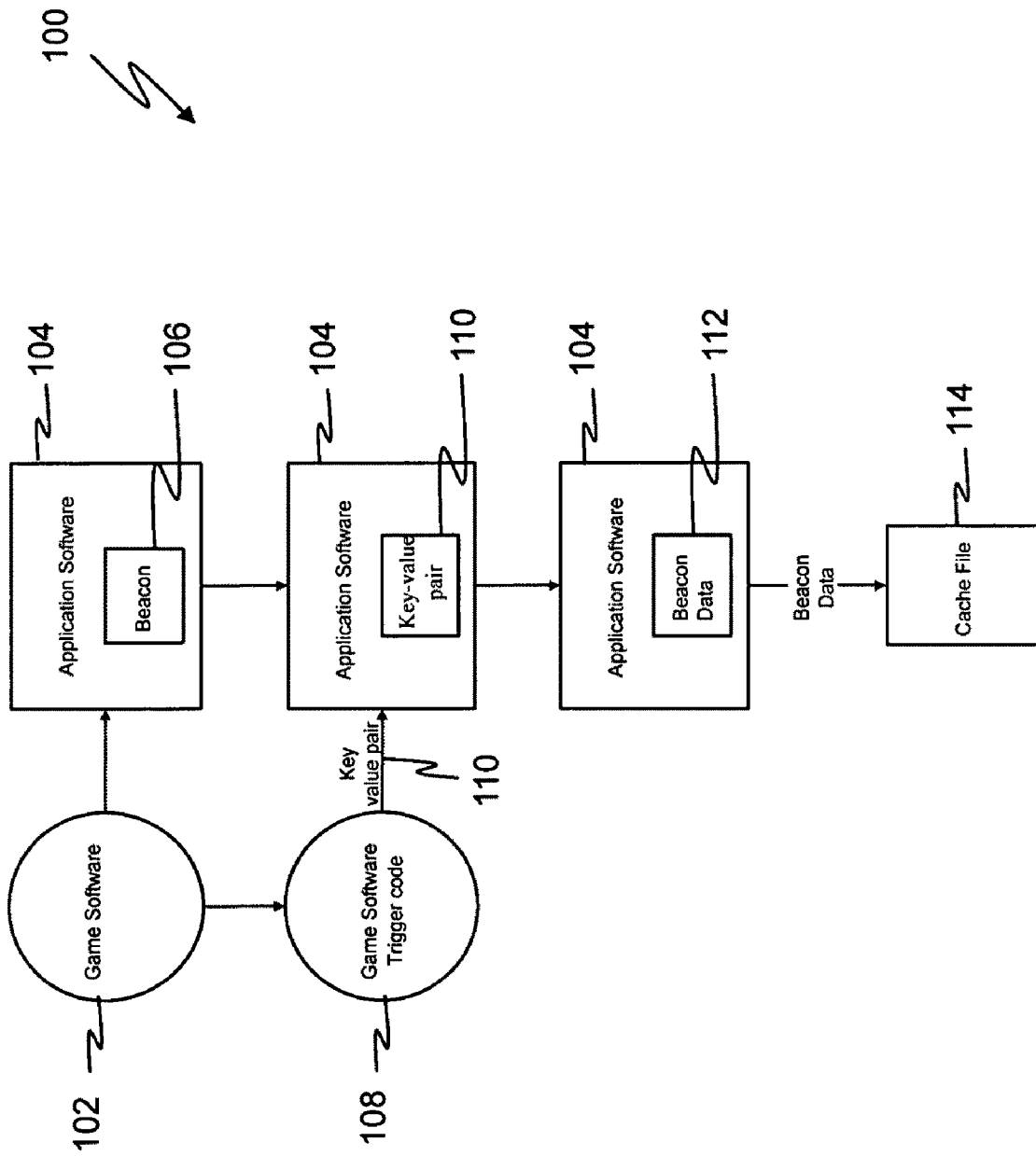
FIG. 2 is a block diagram illustrating one embodiment of an interaction between the game software and the application software, in accordance with the present invention.

Referring to FIG. 2, a schematic block diagram illustrating one embodiment of a gaming environment 100 and an interaction between the game software 102 and the application software 104 (such as an SDK) is illustrated, in accordance with the present invention. In this instance, as the game software 102 and the application software 104 operate, a predetermined incident or triggering event (i.e. a beacon 106) occurs that sets off a trigger in the game software 102. This trigger causes the game software trigger code 108 to generate key-value pair data 110 responsive to the triggering event 106, where the key-value pair data 110 is communicated to the application software 104. It should be appreciated that the trigger may be activated via any type of event internal or external to the game software 102 and that the key-value pair data may be responsive to trigger and/or non-trigger events, as desired. The application software 104 then generates beacon data 112 responsive to the beacon 106 and the key-value pair data 110 and communicates the beacon data 112 to the cache file 114 and/or network 116 for further analysis and/or action.

For example, as discussed briefly hereinbefore, if the key-value pair data generated in response to the triggering event 106 were "Whatad=123," "UserId=7," "Duration=10 s" and "Angle=0," then the generated beacon data would be "Whatad=123&UserId=7&Duration=10 s&Angle=0."

Figure 3:
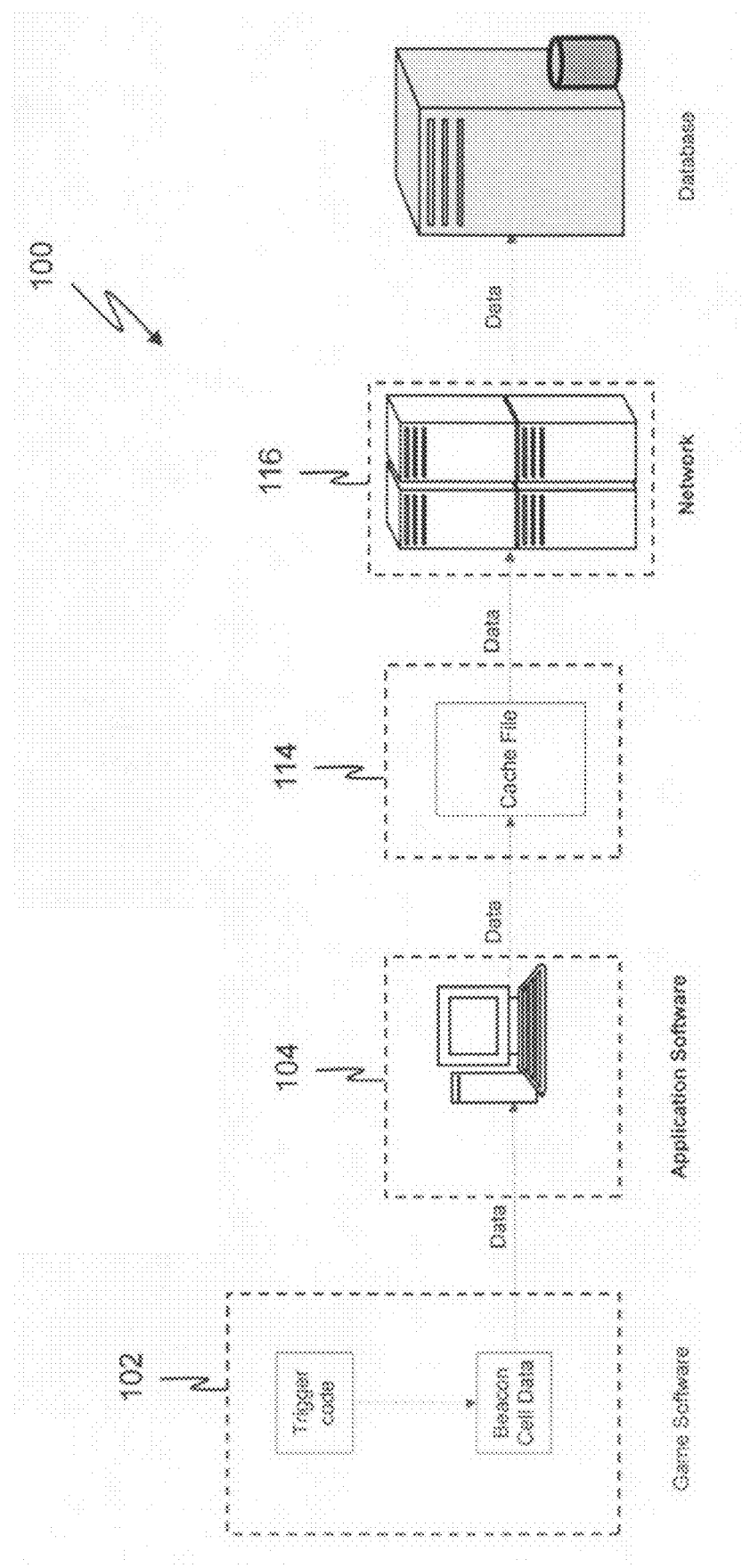
FIG. 3 is a block diagram illustrating one embodiment of an exemplary gaming environment, in accordance with the present invention.
Figure 4:
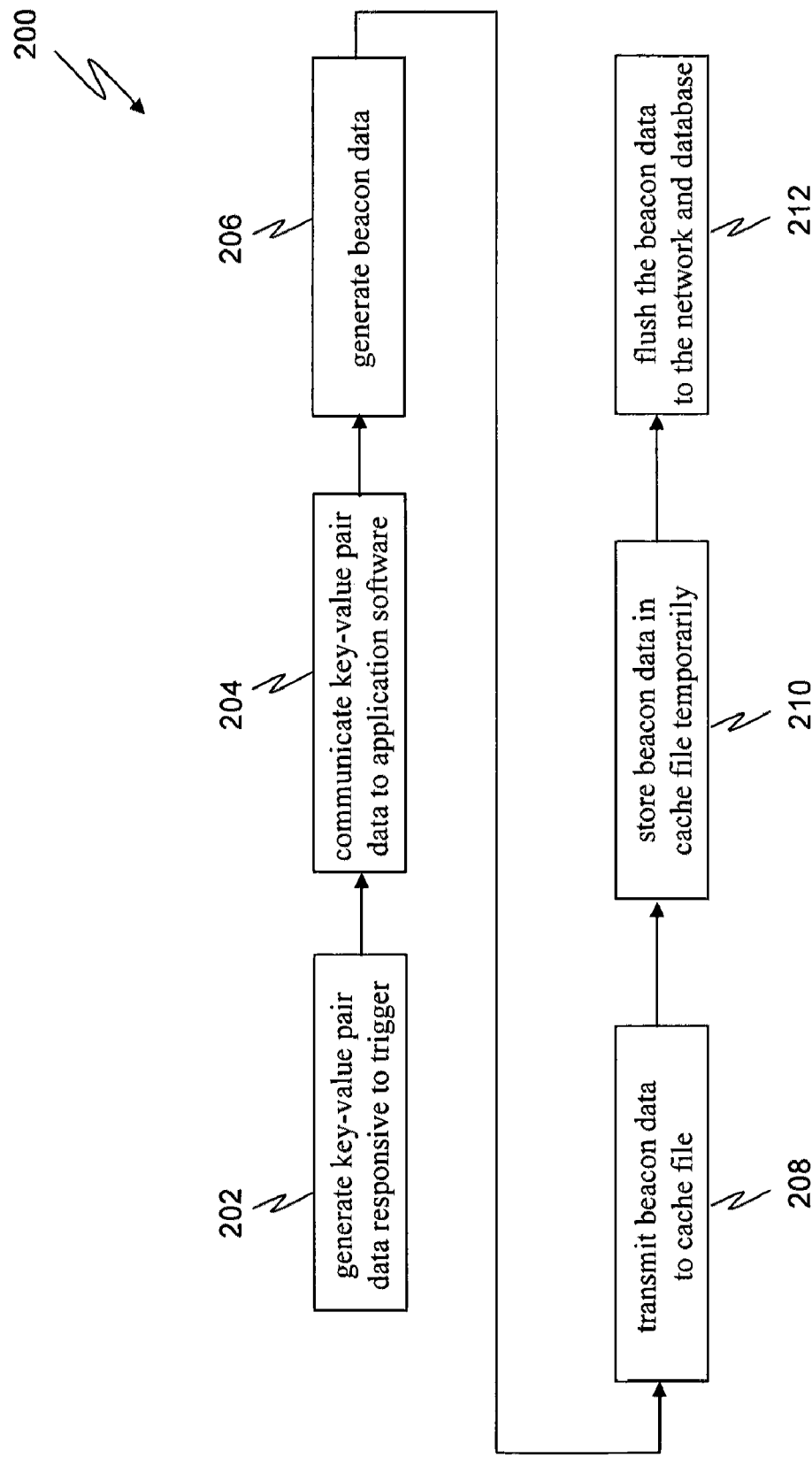
FIG. 4 is a block diagram illustrating one embodiment of method for tracking data in a gaming environment, in accordance with the present invention.

Referring to FIG. 3 and FIG. 4, a block diagram illustrating one embodiment of a method 200 for tracking data in a gaming environment 100 is shown in accordance with the present invention. With reference to the discussion hereinbefore regarding FIG. 2, as the game software 102 and the application software 104 is operated, a trigger event or beacon 106 (or some other type of predetermined event as desired) occurs causing the game software trigger code 108 to generate key-value pair data 110 responsive to the triggering event 106, as shown in operational block 202. The key-value pair data 110 is communicated to the application software 104, as shown in operational block 204, which then generates beacon data 112, as shown in operational block 206. The beacon data 112 is then transmitted to the cache file 114, as shown in operational block 208, wherein the cache file 114 temporarily stores the beacon data 112, as shown in operational block 210. The software application 104 then flushes the beacon data 112 to the network 116 and/or a database, as shown in operational block 212, for further processing and/or action. It should be appreciated that beacon data 112 may include any data suitable to the desired end purpose, such as content ID and cell ID.

Figure 5:
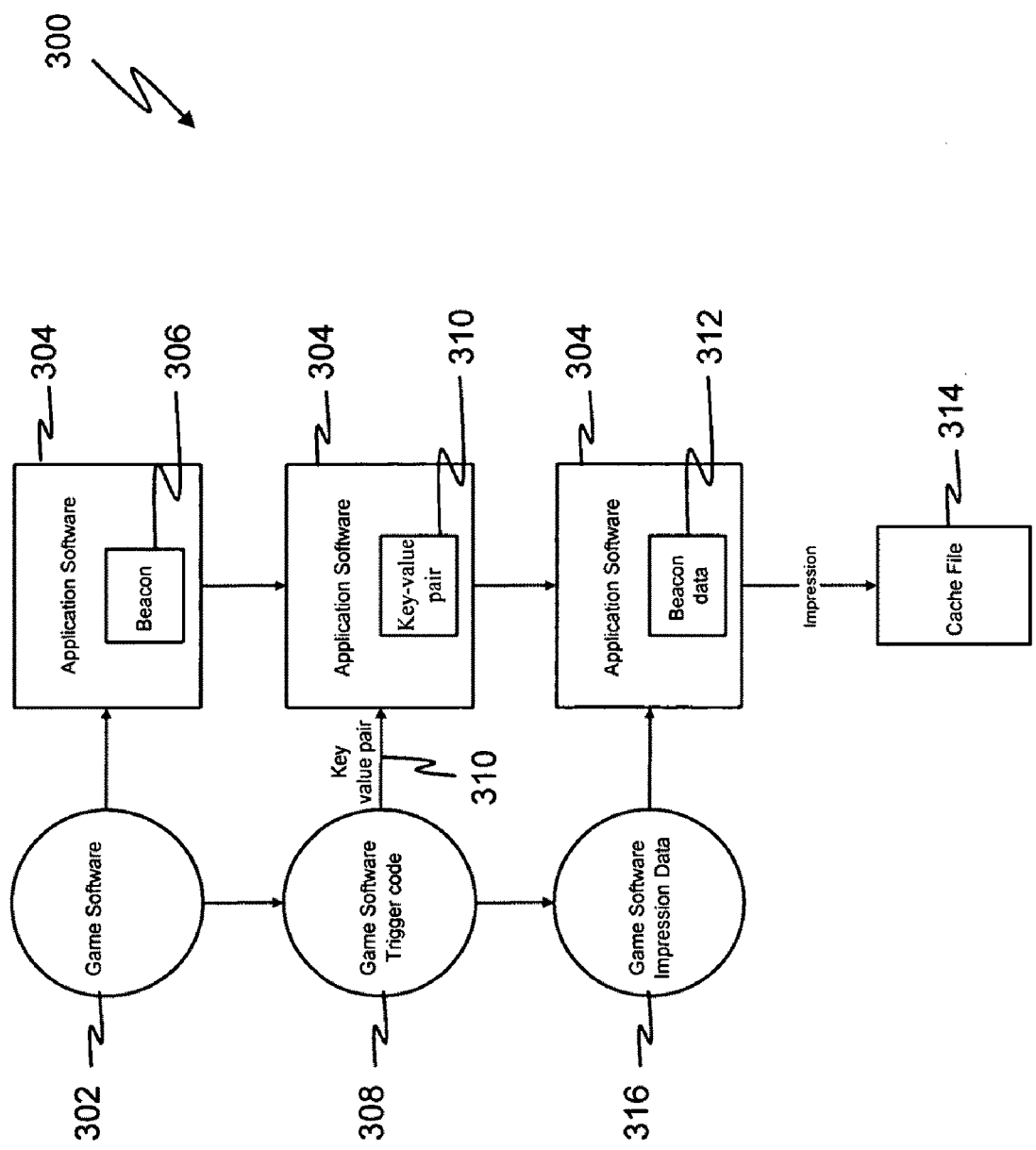
FIG. 5 is a block diagram illustrating another embodiment of an interaction between the game software and the application software, in accordance with the present invention.

Referring to FIG. 5, a schematic block diagram illustrating another embodiment of a gaming environment 300 and an interaction between game software 302 and application software 304 (such as an SDK) is illustrated, in accordance with the present invention. In this instance, as the game software 302 and the application software 304 operate, a predetermined incident or triggering event (i.e. a beacon 306) occurs that sets off a trigger in the game software 302. As above, this trigger causes the game software trigger code 308 to generate an extended key-value pair data 310 responsive to the triggering event 306, where the key-value pair data 310 is communicated to the application software 304. However, in this embodiment, the game software 302 (or the application software) may also generate impression data 316 in response to the triggering event 306 and communicate this impression data 316 to the application software 304. The application software 304 then generates beacon data 312 responsive to the beacon 306, the key-value pair data 310 and/or the impression data 316, wherein the beacon data 312 can be thought of as extended key-value pair data which includes the key-value pair data 310 and the impression data 316.

For example, if the impression data is given as "93:1170876218:1170541888:60118635:175:493:3092:1: 1148:19.5:4," and the key-value data is given as, "Average Score=80.2," "PlayerName=BigDog," and "CurrentScore=70," then the resulting beacon data 312 could be represented as "93:1170876218:1170541888:60118635: 175:493:3092:1:1148:19.5:4:Average Score=80.2&Player Name=BigDog&CurrentScore=70." The application software 304 then communicates the beacon data 312 to the cache file 314 for further action. It should be appreciated that the data, such as key-value pair data 310, impression data 316 and/or beacon data 312, may be generated via any means and/or software, internal or external to the game software, suitable to the desired end purpose.

Figure 6:
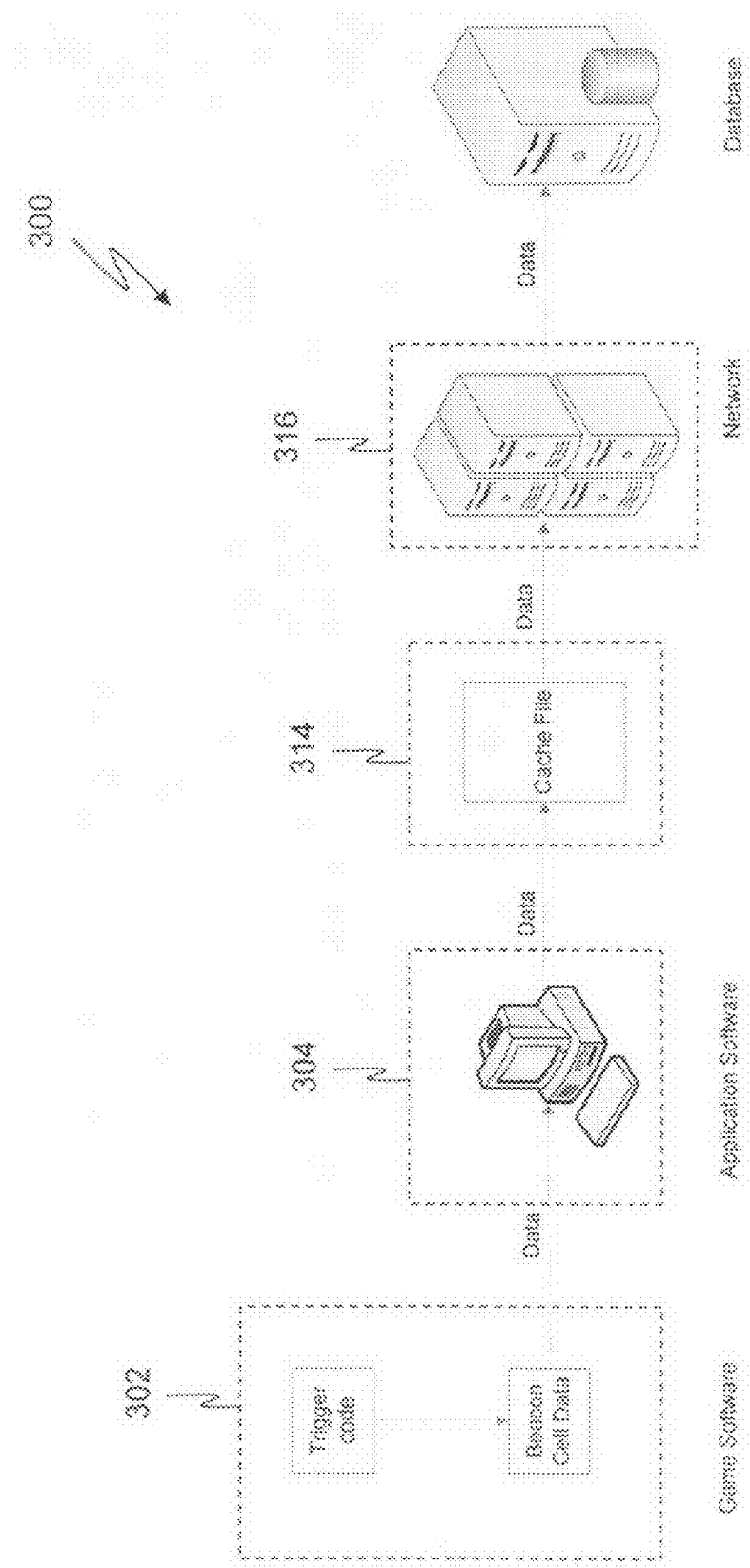
FIG. 6 is a block diagram illustrating an embodiment of an exemplary gaming environment, in accordance with the present invention.
Figure 7:
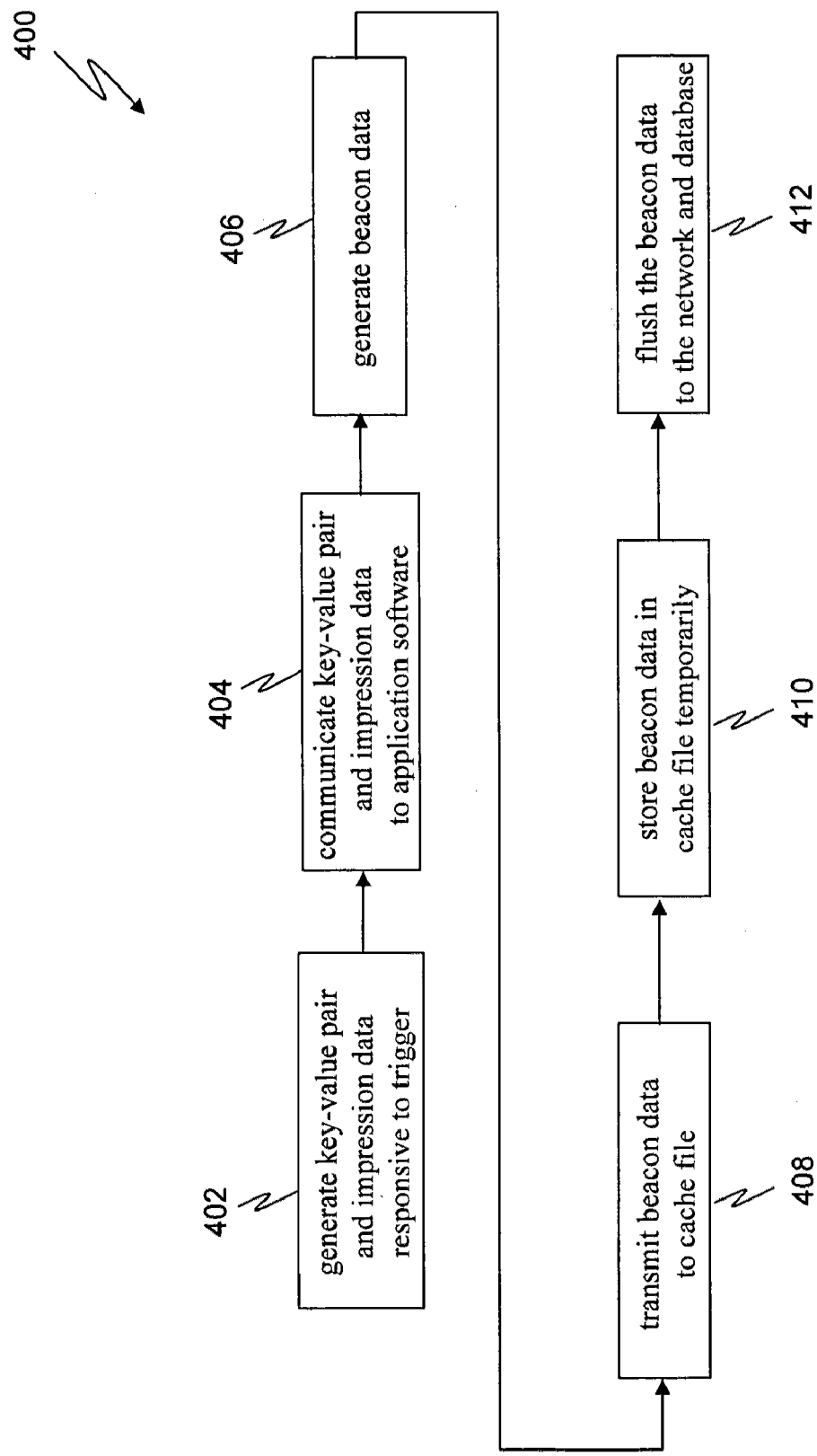
FIG. 7 is a block diagram illustrating another embodiment of a method for tracking data in a gaming environment as shown in FIG. 5 and in accordance with the present invention.

Referring to FIG. 6 and FIG. 7, a block diagram illustrating one embodiment of method 400 for tracking data in a gaming environment 300 is shown in accordance with the present invention. With reference to the discussion hereinbefore regarding FIG. 5, as the game software 302 and the application software 304 is operated, a trigger event or beacon 306 (or some other type of predetermined event as desired) occurs causing the game software trigger code 308 to generate key-value pair data 310 and impression data 316 responsive to the triggering event 306, as shown in operational block 402. The key-value pair data 310 and the impression data 316 is communicated to the application software 304, as shown in operational block 404, which generates beacon data 312 responsive to the key-value pair data 310 and/or the impression data 316, as shown in operational block 406. The beacon data 312 is transmitted to the cache file 314, as shown in operational block 408, wherein the cache file 314 temporarily stores the beacon data 312, as shown in operational block 410. The beacon data 312 is then flushed to the network and/or the database for further processing and/or action, as shown in operational block 412. It should be appreciated that beacon data 312 may include any data suitable to the desired end purpose, such as content ID and cell ID.

In accordance with the present invention, the database may store the beacon data 212, 312, as discussed hereinafter. In accordance with the present invention, referring to FIG. 8 a block diagram illustrating a method 500 for storing beacon data 212, 312 is illustrated and includes receiving the beacon data 212, 312, as shown in operational block 502. It should be appreciated that the beacon data 212, 312 may be transmitted to the database from the network after key-value pair and/or impression data is generated and may include multiple kinds of data, such as data that the database and/or system knows the format of and data that the database and/or system has no prior knowledge of. At this point it is determined if the beacon data include impression data, as shown in operational block 504. If the beacon data does not contain impression data and only contains key-value data, then the key-value data is inserted into a key-value table, as shown in operational block 506. However, if the beacon data does contain impression data and key-value data, then the impression data is separated from the key-value data, as shown in operational block 508. The impression data and the key-value data are then separated into an impression table and a key-value table, as shown in operational block 510. For example, consider the situation where the beacon data 212, 312 is split into one row in the Impression Database and three rows in the Beacon Table—one for each piece of data the database has no prior knowledge of, wherein each piece of data that the system has no prior knowledge of may be delivered in a string. In this case the beacon data 212, 312 may include impression data that is represented by the following data string, Beacon Data
93:1170876218:1170541888:60118635:175:493:3092:1: 1148:19.5:4: Average Score=80.2&PlayerName=Big Dog& CurrentScore=70

This beacon data 212, 312 is then split into 1) impression data, and 2) key-value data and put into an impression database table and a key-value table as follows, Impression Database Table
760, 5612, 493, 93, 175, 60118635, 1170876218, 1170541888, 19.5, 1148, 5.4, where, the first and second values in the impression database table may be reserved for a Time_ID value (which is indicative of the time the impression was generated) and an Impression_ID value (which allows the impression to be referenced in the key-value table). In the impression database table above, the Time_ID value is given as 760 and the Impression_ID value is given as 5612. Accordingly, the key-value table for this example can be represented as,

| KEY-VALUE TABLE |
| --- |
| 5612, 1, 'AverageScore', '80.2' |
| 5612, 2, 'PlayerName', 'BigDog' |
| 5612, 3, 'CurrentScore', 70' | where, the data in the key-value table is referencing the impression associated with Impression_ID value 5612. In the above impression database table, the database has prior knowledge of the data up until the latest event and no prior knowledge of the data from latest event and beyond.

It should be appreciated that the key-value table above may then be split into multiple other tables as described hereinafter. Consider the situation where three sets of beacon data is represented in the key-value table by "WhatId=123," "Averagescore=456" and "Averagescore=80.2." In this case, the resultant beacon data may be split into a "key reference table," a "value reference table" and a "key-value reference table," as shown immediately below.

| Key Reference Table | | Value Reference Table | | Key-Value Reference Table | |
| --- | --- | --- | --- | --- | --- |
| Ref. Id | Key | Ref. Id. | Value | Key | Value |
| 1 | WhatId | 1 | 123 | 1 | 1 |
| 2 | Averagescore | 2 | 456 | 2 | 2 |
|  |  | 3 | 80.2 | 2 | 3 |

It should be appreciated that the method of the present invention may be embodied, in whole or in part, via software, firmware and/or hardware. Accordingly, the invention may be implemented via any type or configuration of software suitable to the desired end purpose, such as a generic SDK and/or an application specific SDK. Furthermore, the software application practicing the invention may or may not be embedded, in whole or in part. It should also be appreciated that the method of the present invention may be embodied, in whole or in part, via instruction using training manuals (i.e. text-based materials), seminars, classes, and/or any other media suitable to the desired end purpose. Moreover, it should be appreciated that although the method of the present invention may be implemented, in whole or in part, via software, hardware, firmware and/or any combination thereof, it is also contemplated that the method of the present invention may also be implemented, in whole or in part, without the use of software, hardware, firmware and/or any combination thereof. For example, without the full or partial use of any software, hardware and/or firmware and/or with any combination thereof, but rather via instruction using PC based software and/or classroom instruction with text materials (i.e. books, pamphlets, handouts, tapes, optical media, etc.).

Moreover, each of the elements of the present invention may be implemented in part, or in whole, in any order suitable to the desired end purpose. In accordance with an exemplary embodiment, the processing required to practice the method of the present invention, either in whole or in part, may be implemented, wholly or partially, by a controller operating in response to a machine-readable computer program. In order to perform the prescribed functions and desired processing, as well as the computations therefore (e.g. execution control algorithm(s), the control processes prescribed herein, and the like), the controller may include, but not be limited to, a processor(s), computer(s), memory, storage, register(s), timing, interrupt(s), communication interface(s), and input/output signal interface(s), as well as combination comprising at least one of the foregoing. It should also be appreciated that the embodiments disclosed herein are for illustrative purposes only and include only some of the possible embodiments contemplated by the present invention.

Furthermore, the invention may be wholly or partially embodied in the form of a computer system or controller implemented processes. It should be appreciated that any type of computer system (as is well known in the art) and/or gaming system may be used and that the invention may be implemented via any type of network setup, including but not limited to a LAN and/or a WAN (wired or wireless). The invention may also be embodied in the form of computer program code containing instructions embodied in tangible media, such as floppy diskettes, CD-ROMs, hard drives, and/or any other computer-readable medium, wherein when the computer program code is loaded into and executed by a computer or controller, the computer or controller becomes an apparatus for practicing the invention. The invention can also be embodied in the form of computer program code, for example, whether stored in a storage medium, loaded into and/or executed by a computer or controller, or transmitted over some transmission medium, such as over electrical wiring or cabling, through fiber optics, or via electromagnetic radiation, wherein when the computer program code is loaded into and executed by a computer or a controller, the computer or controller becomes an apparatus for practicing the invention. When implemented on a general-purpose microprocessor the computer program code segments may configure the microprocessor to create specific logic circuits.

While the invention has been described with reference to an exemplary embodiment, it should be understood by those skilled in the art that various changes may be made and equivalents may be substituted for elements thereof without departing from the scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

We claim:

1. A method for tracking data in a gaming environment using a beacon, comprising:
    identifying an occurrence of a triggering event in a gaming environment;
    receiving event data in response to the triggering event in the gaming environment, wherein the event data includes a first key-value pair and a second key-value pair;
    generating beacon data responsive to the event data, wherein generating includes identifying and combining the first key-value pair and the second key-value pair;
    processing the beacon data to generate a key-value table data; and
    at least one of,
        storing the key-value table data in a storage device, and
        displaying the key-value table data via a display device.

2. The method of claim 1, wherein each of the first key-value pair and second key-value pair includes a related key and value, and wherein generating beacon data further includes identifying the related key and value for each of the first and second key-value pairs identified.

3. The method of claim 2, wherein generating beacon data further includes generating a data string which includes the related key and value being separated from each other by a first character and the first and second key-value pairs being separated from each other by a second character.

4. The method of claim 1, wherein said generating beacon data further includes receiving impression data and concatenating the impression data with the at least one key-value pair data.

5. A system for implementing a method for tracking data in a gaming environment using a beacon, comprising:
    a network having a database; and
    a gaming device connected to the network and configured to operate in a gaming environment, wherein at least one of the gaming device and the network includes a means for,
    identifying an occurrence of a triggering event in a gaming environment;
    receiving event data in response to the triggering event in the gaming environment, wherein the event data includes a first key-value pair and a second key-value pair;
    generating beacon data responsive to the event data, wherein generating includes identifying and combining the first key-value pair and the second key-value pair;
    processing the beacon data to generate a key-value table data; and
    at least one of,
        storing the key-value table data in a storage device, and
        displaying the key-value table data via a display device.

6. The system of claim 5, wherein each of the first key-value pair and second key-value pair includes a related key and value, and wherein generating beacon data further includes identifying the related key and value for each of the first and second key-value pairs identified.

7. The method of claim 6, wherein generating beacon data further includes generating a data string which includes the related key and value being separated from each other by a first character and the first and second key-value pairs being separated from each other by a second character.

8. The method of claim 5, wherein said generating beacon data further includes receiving impression data and concatenating the impression data with the at least one key-value pair data.

9. A computer readable storage medium having computer executable instructions for implementing a method for tracking data in a gaming environment using a beacon, comprising:
    identifying an occurrence of a triggering event in a gaming environment;
    receiving event data in response to the triggering event in the gaming environment, wherein the event data includes a first key-value pair and a second key-value pair;
    generating beacon data responsive to the event data, wherein generating includes identifying and combining the first key-value pair and the second key-value pair;

processing the beacon data to generate a key-value table data; and at least one of,
  storing the key-value table data in a storage device, and
  displaying the key-value table data via a display device.

10. The computer readable storage medium of claim 9, wherein wherein each of the first key-value pair and second key-value pair includes a related key and value, and wherein generating beacon data further includes identifying the related key and value for each of the first and second key-value pairs identified.

11. The computer readable storage medium of claim 10, wherein generating beacon data further includes generating a data string which includes the related key and value being separated from each other by a first character and the first and second key-value pairs being separated from each other by a second character.

12. The computer readable storage medium of claim 9, wherein said generating beacon data further includes receiving impression data and concatenating the impression data with the at least one key-value pair data.

13. A method for tracking data in a gaming environment using a beacon, comprising:

identifying an occurrence of a triggering event in a gaming environment;

receiving data in response to the triggering event in the gaming environment, wherein the data includes a first key-value pair and a second key-value pair, each of the first key-value pair and second key-value pair having a key with an associated value;

generating beacon data responsive to the first and second key-value pairs, wherein the beacon data is generated by concatenating each of the keys with the associated values using a first character and concatenating the first key-value pair with the second key-value pair using a second character;

processing the beacon data to generate a key-value table data; and at least one of,
  storing the key-value table data in a storage device, and
  displaying the key-value table data via a display device.

* * * * *